US008429344B2

(12) United States Patent
Haneda

(10) Patent No.: US 8,429,344 B2

(45) Date of Patent: Apr. 23, 2013

(54) STORAGE APPARATUS, RELAY DEVICE, AND METHOD OF CONTROLLING OPERATING STATE

(75) Inventor: Terumasa Haneda, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 655 days.

(21) Appl. No.: 12/263,445

(22) Filed: Oct. 31, 2008

(65) Prior Publication Data

US 2009/0204760 A1 Aug. 13, 2009

(30) Foreign Application Priority Data

Feb. 7, 2008 (JP) ................................ 2008-028115

(51) Int. Cl.
*G06F 13/00* (2006.01)
*G06F 13/28* (2006.01)

(52) U.S. Cl.
USPC ..... 711/114; 711/154; 711/167; 711/E12.019

(58) Field of Classification Search ........................ None
See application file for complete search history.

(56) References Cited

U.S. PATENT DOCUMENTS 6,317,787 B1 * 11/2001 Boyd et al. .................... 709/224
6,583,947 B1 * 6/2003 Hakamata et al. .............. 360/69
2002/0052898 A1 * 5/2002 Schilit et al. .................. 707/530

FOREIGN PATENT DOCUMENTS

JP 08-102132 4/1996
JP 2000-293314 10/2000
JP 2005-228288 A 8/2005
JP 2006-302300 11/2006

OTHER PUBLICATIONS

"Japanese Office Action" mailed by JPO and corresponding to Japanese application No. 2008-028115 on Jan. 26, 2010, with Partial English translation.

* cited by examiner

*Primary Examiner* — Reginald Bragdon
*Assistant Examiner* — Eric S Cardwell
(74) *Attorney, Agent, or Firm* — Fujitsu Patent Center

(57) ABSTRACT

Each time any one of HDDs is accessed, a corresponding relationship between the disk address of the accessed HDD and the time information indicating a time at which the HDD is accessed is added to a first operating-state management table. When a corresponding relationship with the same disk address already exists in the first operating-state management table, the time information is updated. When the first operating-state management table has no space available for new entry, corresponding relationships are deleted from the one having the oldest time information. Only HDDs of which disk address is recorded in the first operating-state management table is turned on.

11 Claims, 6 Drawing Sheets

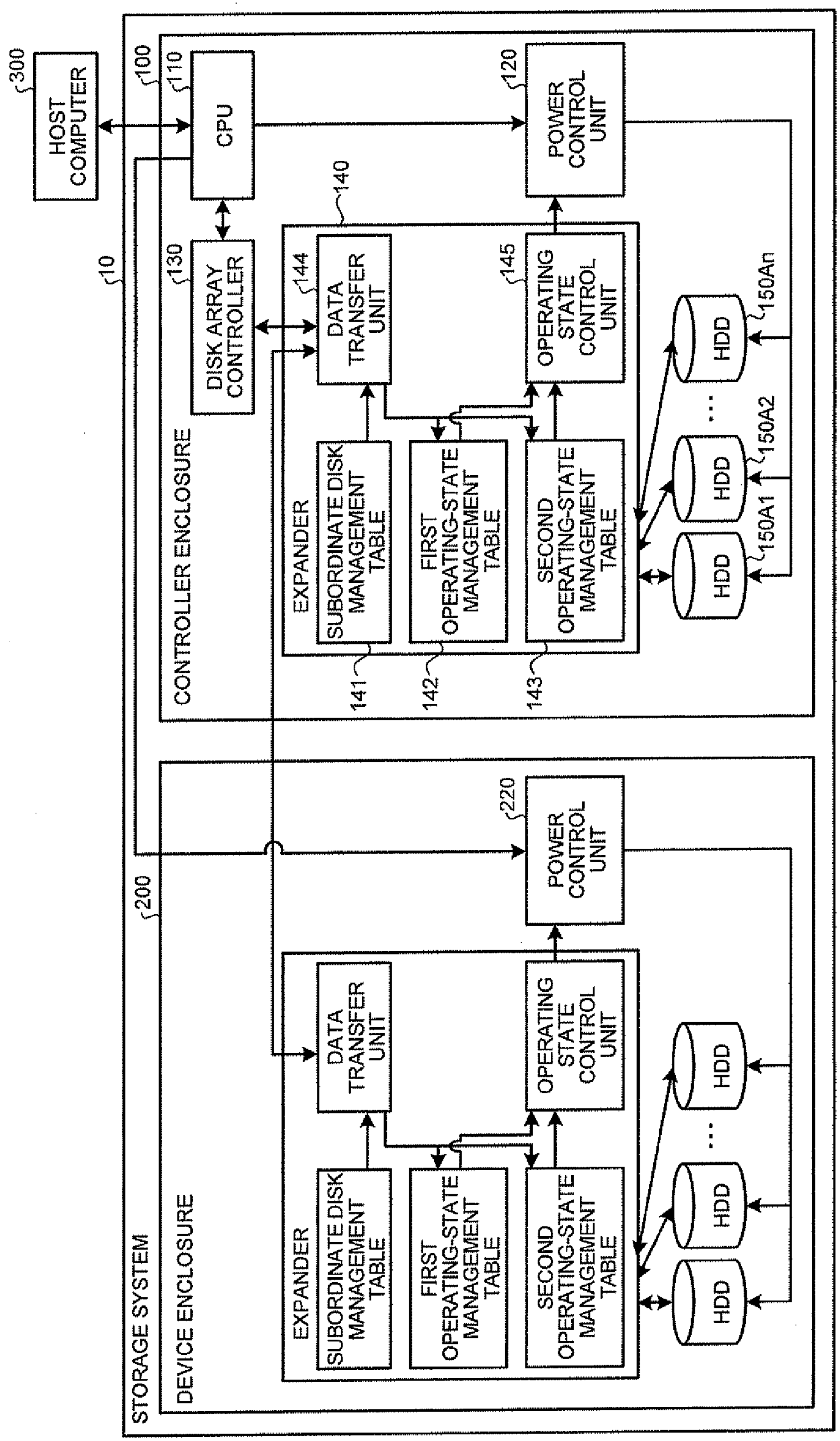
FIG.1
HOST COMPUTER
300
10
STORAGE SYSTEM
100
CONTROLLER ENCLOSURE
110
CPU
120
POWER CONTROL UNIT
130
DISK ARRAY CONTROLLER
140
EXPANDER
144
DATA TRANSFER UNIT
145
OPERATING STATE CONTROL UNIT
SUBORDINATE DISK MANAGEMENT TABLE
FIRST OPERATING-STATE MANAGEMENT TABLE
SECOND OPERATING-STATE MANAGEMENT TABLE
141
142
143
HDD
150A1
150A2
150An
200
DEVICE ENCLOSURE
220
POWER CONTROL UNIT
EXPANDER
DATA TRANSFER UNIT
OPERATING STATE CONTROL UNIT
SUBORDINATE DISK MANAGEMENT TABLE
FIRST OPERATING-STATE MANAGEMENT TABLE
SECOND OPERATING-STATE MANAGEMENT TABLE
HDD

FIG.3

SUBORDINATE DISK MANAGEMENT TABLE

| |
|---|
| 01 |
| 02 |
| 03 |
| 04 |
| 05 |
| 06 |
| ⋮ |
| n |

FIG.4

FIRST OPERATING-STATE MANAGEMENT TABLE

| | [1] | [2] | [3] | ··· | [k] |
|---|---|---|---|---|---|
| ACCESS TIME | | | | ··· | |
| DISK ADDRESS | | | | ··· | |

FIG.5

SECOND OPERATING-STATE MANAGEMENT TABLE

| | [1] | [2] | [3] | ··· | [m] |
|---|---|---|---|---|---|
| ACCESS TIME | | | | ··· | |
| DISK ADDRESS | | | | ··· | |

FIG.8

| | DISK ADDRESS | ACCESS TIME |
|---|---|---|
| FIRST OPERATING-STATE MANAGEMENT TABLE | 08 | 13:55 |
| | 02 | 13:54 |
| | 09 | 13:40 |
| SECOND OPERATING-STATE MANAGEMENT TABLE | 03 | 13:33 |
| | 01 | 12:58 |
| | 10 | 11:49 |

| DISK ADDRESS | ACCESS TIME |
|---|---|
| 09 | 14:00 |
| 08 | 13:55 |
| 02 | 13:54 |
| 03 | 13:33 |
| 01 | 12:58 |
| 10 | 11:49 |

FIG.9

| | DISK ADDRESS | ACCESS TIME |
|---|---|---|
| FIRST OPERATING-STATE MANAGEMENT TABLE | 08 | 13:55 |
| | 02 | 13:54 |
| | 09 | 13:40 |
| SECOND OPERATING-STATE MANAGEMENT TABLE | 03 | 13:33 |
| | 01 | 12:58 |
| | 10 | 11:49 |

U1

| DISK ADDRESS | ACCESS TIME |
|---|---|
| 03 | 14:00 |
| 08 | 13:55 |
| 02 | 13:54 |
| 09 | 13:40 |
| 01 | 12:58 |
| 10 | 11:49 |

FIG.10

| | DISK ADDRESS | ACCESS TIME |
|---|---|---|
| FIRST OPERATING-STATE MANAGEMENT TABLE | 08 | 13:55 |
| | 02 | 13:54 |
| | 09 | 13:40 |
| SECOND OPERATING-STATE MANAGEMENT TABLE | 03 | 13:33 |
| | 01 | 12:58 |
| | 10 | 11:49 |

U2

U3

DELETE

| DISK ADDRESS | ACCESS TIME |
|---|---|
| 07 | 14:00 |
| 08 | 13:55 |
| 02 | 13:54 |
| 09 | 13:40 |
| 03 | 13:33 |
| 01 | 12:58 |

STORAGE APPARATUS, RELAY DEVICE, AND METHOD OF CONTROLLING OPERATING STATE

BACKGROUND OF THE INVENTION

1. Field of the Invention

The embodiments discussed herein are directed to a storage apparatus including storage devices, a relay device that controls access to the storage devices, and a method of controlling an operating state of the storage devices.

2. Description of the Related Art

Some disk array apparatus are mounted with a serial attached small computer systems interface (SAS) disk and a serial advanced technology attachment (SATA) disk.

Such a disk array apparatus includes a plurality of housings connected thereto for housing a plurality of hard disk drives (HDDs).

One of the housings, or a controller enclosure, is connected directly to a host computer. Thus, the controller enclosure may be accessed by the host computer, and performs overall control of data storage.

The housings other than the controller enclosure, or device enclosures, may be connected when an HDD is to be added.

Each of the housings includes a processing unit called an expander that relays data between the housings and that performs reading from or writing to an HDD.

When an HDD is added, another device enclosure is connected either to the controller enclosure or to an existing device enclosure with the expanders being communicatively connected.

In the disk array apparatus, for example, write data requested by the host computer is transferred by the expander from the controller enclosure to a device enclosure to which the write data is written, and thus the data is written to an HDD to which the data is written.

A large number of HDDs are mounted on a disk array apparatus that is configured as above, as well as on a general disk array apparatus. Therefore, if power is supplied to all the HDDs, the disk array apparatus consumes excessive amount of power.

In Japanese Laid-open Patent Publication No. 2000-293314, a conventional technology is disclosed in which access made by a host computer is managed for each HDD group (redundant array of independent disks (RAID) group). More specifically, in the conventional technology, access thereto by the host computer is managed so that if a certain RAID group is not accessed by the host computer for a certain period of time, all the HDDs in the RAID group are brought into a power saving mode.

In a disk array apparatus having an SAS disk and an SATA disk mounted thereon also, it is desirable that power consumption thereof be reduced.

The conventional technology is capable of reducing power consumption of such a disk array apparatus having an SAS disk and an SATA disk mounted. However, a state of an HDD is controlled depending on an access interval thereof, and power consumption thereof is not sufficiently reduced. More specifically, the same amount of power is supplied, for example, to an HDD that is not so frequently accessed but that is accessed once during a certain period of time or less and to an HDD that is frequently accessed for a plurality of times during the same period of time.

Besides, in the disk array apparatus, all the HDDs are managed collectively. However, each of the housings includes an expander, and therefore, it is desirable that each of the expanders control a state of each of the HDDs stored in the housings to reduce power consumption so that processing load can be distributed among the expanders.

SUMMARY

It is an object of the present invention to at least partially solve the problems in the conventional technology.

According to an aspect of the present invention, there is provided a storage apparatus includes: a power supply unit that is connected to an external power source and supplies power; a storage device that is supplied with power from the power supply unit to operate; and a relay device that controls access to the storage device. The relay device is provided with a storage device management table that stores therein a corresponding relationship between identifying information of the storage device accessed by a server and time information indicating a time at which the storage device is accessed by the server. The relay device includes an operation control unit that controls an operating state of the storage device based on the storage device management table.

According to another aspect of the present invention, there is provided a relay device that is provided in a storage apparatus including a storage device to control access to the storage device. The relay device includes: a storage device management table that stores therein a corresponding relationship between identifying information of the storage device accessed by a server and time information indicating a time at which the storage device is accessed by the server; and an operation control unit that controls an operating state of the storage device based on the storage device management table.

According to still another aspect of the present invention, there is provided a method of controlling an operating state of a storage device in a storage apparatus, which is applied to a relay device that controls access to the storage device. The method includes: registering in a storage device management table a corresponding relationship between identifying information of the storage device accessed by a server and time information indicating a time at which the storage device is accessed by the server; and controlling an operating state of the storage device based on the storage device management table.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic of a storage system according to an embodiment of the present invention;

FIG. 3 is an example of information stored in a subordinate disk management table 141 depicted in FIG. 1;

FIG. 4 is an example of a first operating-state management table 142 depicted in FIG. 1;

FIG. 5 is an example of a second operating-state management table 143 depicted in FIG. 1;

FIG. 8 is a schematic diagram for explaining a first example of the updating process depicted in FIG. 7;

FIG. 9 is a schematic diagram for explaining a second example of the updating process depicted in FIG. 7; and FIG. 10 is a schematic diagram for explaining a third example of the updating process depicted in FIG. 7.

DETAILED DESCRIPTION OF THE PREFERRED EMBODIMENTS

Figure 2:
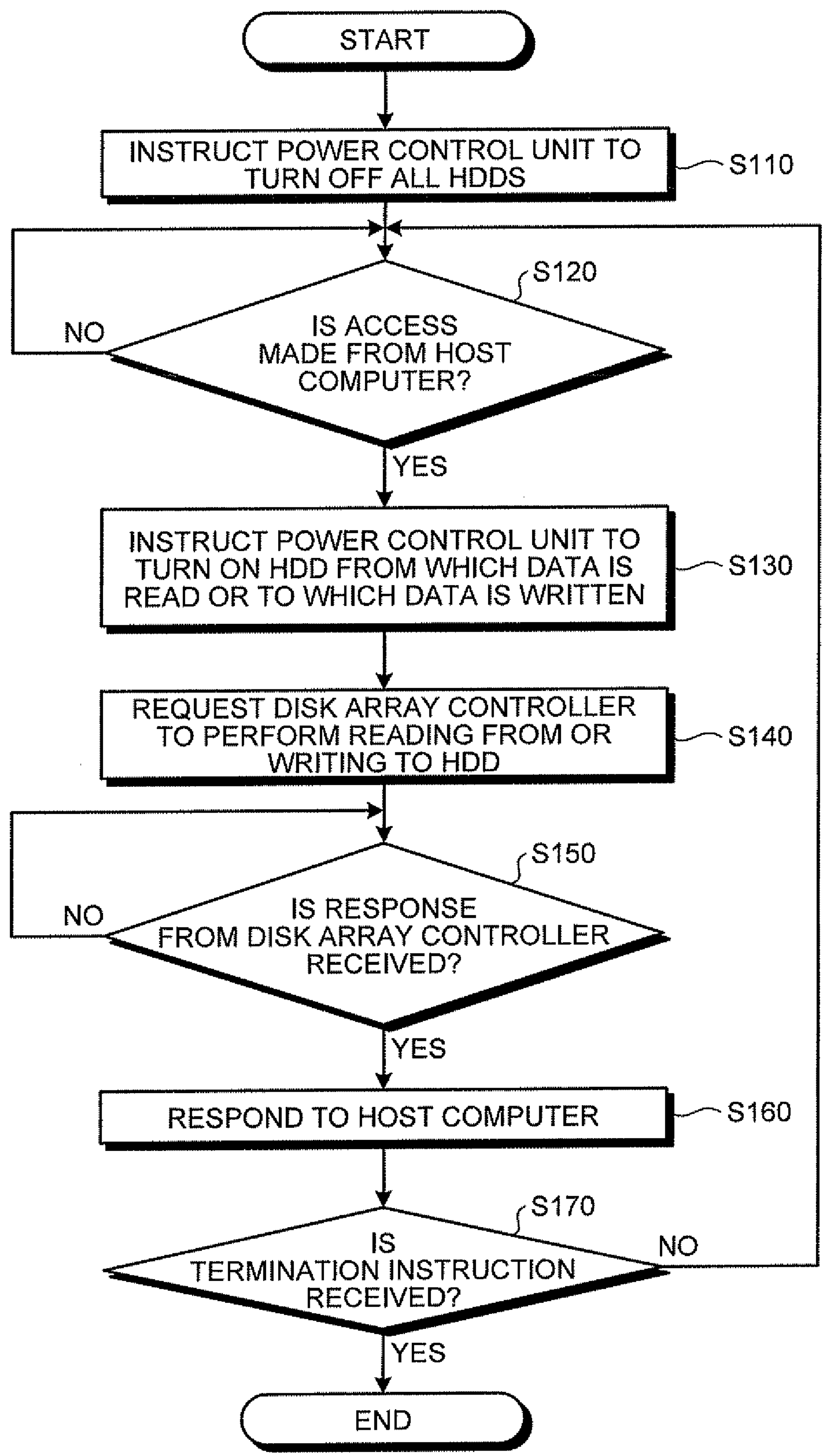
FIG. 2 is a flowchart of processes performed by a CPU of the storage system.

Exemplary embodiments of the present invention are described in detail below with reference to the accompanying drawings.

FIG. 1 is a schematic diagram of a storage system 10 according to an embodiment. As depicted in FIG. 1, the storage system 10 includes a controller enclosure 100 and a device enclosure 200.

The controller enclosure 100 includes a plurality of HDDs, and receives access from a host computer 300 connected directly thereto. The device enclosure 200 is connected to the controller enclosure 100 if a plurality of HDDs are added thereto. Although FIG. 1 depicts only one device enclosure 200 by way of example, there may be a plurality of device enclosures 200.

The storage system 10 provides one of the HDDs, as a physical disk, included in the controller enclosure 100 or the device enclosure 200 to the host computer 300. Alternatively, the storage system 10 provides some of the HDDs together as a logical disk to the host computer 300.

A unit of disks provided to the host computer 300 by the storage system 10 can be specified arbitrarily in terms of volume. For example, assuming that a volume of each of the HDDs is 20 gigabytes, all the five HDDs in the controller enclosure 100, and all the five HDDs in the device enclosure 200, may be provided to the host computer 300 as one logical disk of 100 gigabyte each.

Each component of the controller enclosure 100 is described below. The controller enclosure 100 and the device enclosure 200 are of like configuration and thus but one of them, the controller enclosure 100, is described below.

The controller enclosure 100 includes a central processing unit (CPU) 110, a power control unit 120, a disk array controller 130, an expander 140, and a plurality of HDDs 150A1 to 150An.

The HDDs 150A1 to 150An store therein user data transferred from the host computer 300. The HDDs 150A1 to 150An are turned on or off in response to an instruction from the power control unit 120.

While being ON, the HDDs 150A1 to 150An can be brought into standby or a state in which power consumption thereof is reduced even though the power is ON. The HDDs 150A1 to 150An are brought into standby in response to an instruction from an operating state control unit 145 in the expander 140, described later.

Similar to an HDD being OFF, an HDD in standby cannot be accessed. In other words, an HDD in such condition is in its access disabled state. Therefore, to read data therefrom or write data thereto again, each of the HDDs 150A1 to 150An is brought into its normal operating state. That is, an HDD can be accessed only in its normal operating state (access enabled state).

The CPU 110 controls the storage system 10. The operation of the CPU 110 is described in detail below with reference to FIG. 2. FIG. 2 is a flowchart of processes performed when the storage system 10 is ON.

As depicted in FIG. 2, the CPU 110 first instructs the power control unit 120 and a power control unit 220 in the device enclosure 200 to turn off all the HDDs (Step S110).

If access is made from the host computer 300 (YES at Step S120), the CPU 110 instructs each of the power control units to turn on an HDD to which data is written or from which data is read (Step S130), and requests the disk array controller 130 to write data to or read data from the HDD (Step S140).

Then, if notified by the disk array controller 130 of completion of reading from or writing to the HDD (YES at Step S150), the CPU 110 responds to the host computer 300 (Step S160).

The CPU 110 repeats the process from Step S120 to S160 until the CPU 110 receives a termination instruction. If the CPU 110 receives the termination instruction (YES at Step S170), the CPU terminates the processes.

The power control unit 120 controls power supply to each of the HDDs 150A1 to 150An. More specifically, the power control unit 120 turns on or off each of the HDDs 150A1 to 150An in response to an instruction from the CPU 110 or an instruction from the operating state controlling unit 145 of the expander 140 described later.

The disk array controller 130 controls reading from and writing to each of the HDDs in the storage system 10. More specifically, the disk array controller 130 outputs, according to a request from the CPU 110, to the expander 140, information for instructing to read from or to write to an HDD and a predetermined data including identifying information or a disk address of the HDD.

The expander 140 is a processing unit that actually performs reading from and writing to an HDD. The expander 140 includes a subordinate disk management table 141, a first operating-state management table 142, a second operating-state management table 143, a data transfer unit 144, and an operating state control unit 145.

The subordinate disk management table 141 stores therein identifying information or a disk address of each of the HDDs mounted on the controller enclosure 100. The subordinate disk management table 141 stores therein, for example, a plurality of disk addresses such as "01" and "02" as depicted in FIG. 3.

The first operating-state management table 142 stores therein identifying information of each of a predetermined number of HDDs that remain in the normal operating state by supplying power thereto.

More specifically, as depicted in FIG. 4, the first operating-state management table 142 includes one to k recording areas that contain corresponding relationships between an access time indicating a time at which data is read from or write to the respective HDDs and their disk addresses.

The number of recording areas can be specified arbitrarily, when $k<n$ with n being the number of the HDDs mounted on the controller enclosure 100.

The second operating-state management table 143 stores therein identifying information of each of a predetermined number of HDDs that remain in the standby operating state by supplying power thereto.

More specifically, as depicted in FIG. 5, the second operating-state management table 143 includes one to m recording areas that contain corresponding relationships between an access time indicating a time at which the respective HDDs are accessed and their disk addresses, similarly to the first operating-state management table 142.

Similarly, the number of recording areas can be specified arbitrarily, when $m<n$ with n being the number of the HDDs mounted on the controller enclosure 100.

The data transfer unit 144 performs reading from or writing to an HDD. More specifically, if data output from the disk array controller 130 is received, the data transfer unit 144 first compares disk addresses included in the data output from the disk array controller 130 with disk addresses stored in the subordinate disk management table 141.

If a disk address included in the data output from the disk array controller 130 is identical to any one of disk addresses included in the subordinate disk management table 141, the data transfer unit 144 performs reading from or writing to an HDD having the disk address. If the HDD is in standby, however, the HDD is brought out of standby so that data can be read therefrom or written thereto.

Then, the data transfer unit 144 either adds the corresponding relationship to the first operating-state management table 142 or to the second operating-state management table 143, deletes the corresponding relationship in the tables, or updates the access time therein.

If a disk address included in the data output from the disk array controller 130 is not identical to any one of the disk addresses included in subordinate disk management table 141, the data transfer unit 144 transfers the data to the device enclosure 200.

The operating state control unit 145 controls power supply to each of the HDDs and an operating state of each of the HDDs based on information stored in the first operating-state management table 142 and in the second operating-state management table 143.

More specifically, the operating state control unit 145 instructs an HDD having a disk address recorded in the second operating-state management table 143 to be brought into the standby operating state.

The operating state control unit 145 instructs the power control unit 120 to turn off an HDD having a disk address other than any disk addresses recorded in the first operating-state management table 142 or in the second operating-state management table 143.

The operating state control unit 145 may monitor a difference between the oldest access time recorded in the first operating-state management table 142 or in the second operating-state management table 143 and the current time. When the difference exceeds a predetermined value, the operating state control unit 145 may delete a corresponding relationship between the oldest access time and a disk address corresponding thereto, and may cause the power control unit 120 to turn off an HDD having the disk address.

Figure 6:
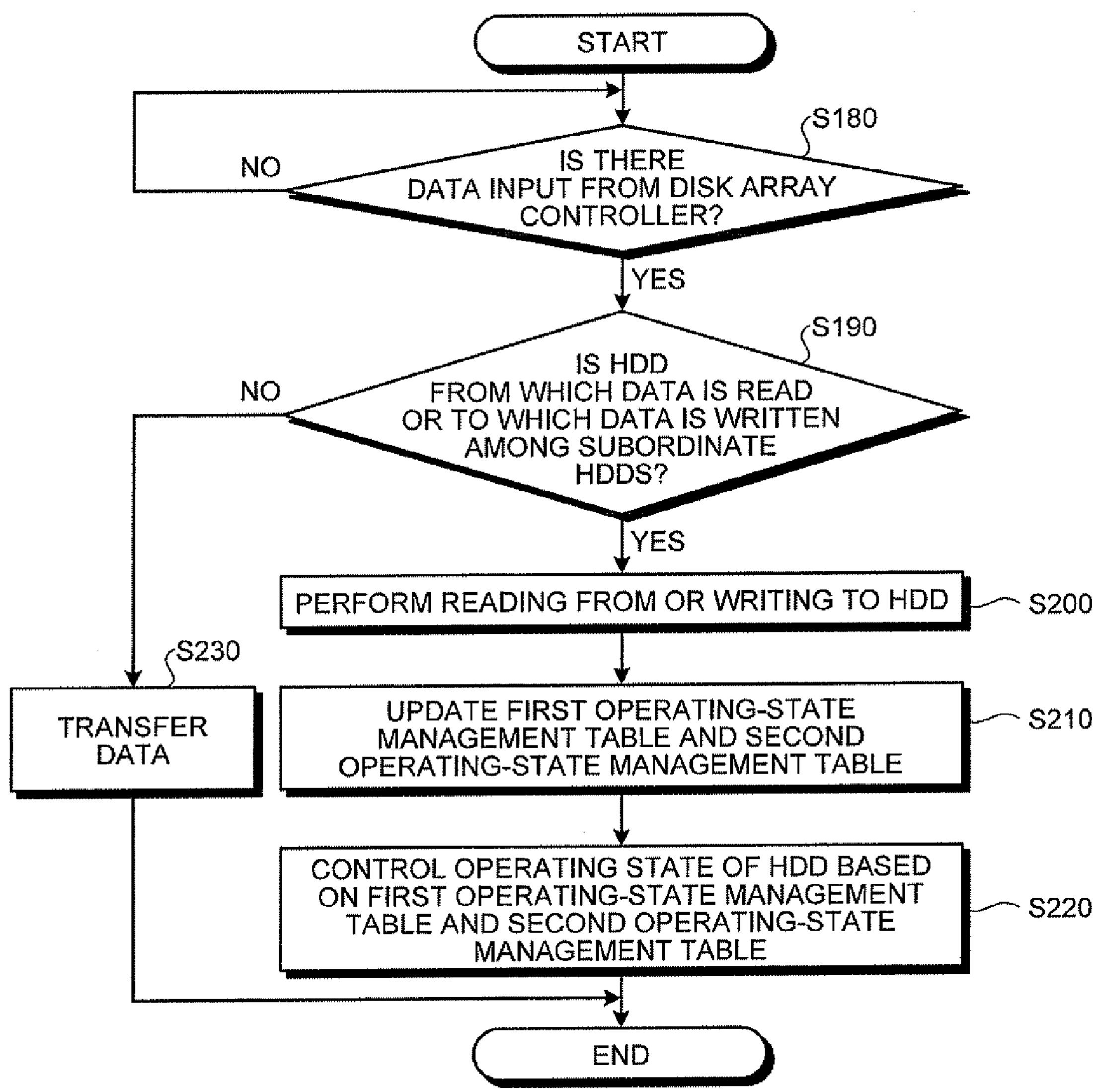
FIG. 6 is a flowchart of processes performed by an expander depicted in FIG. 1.
Figure 7:
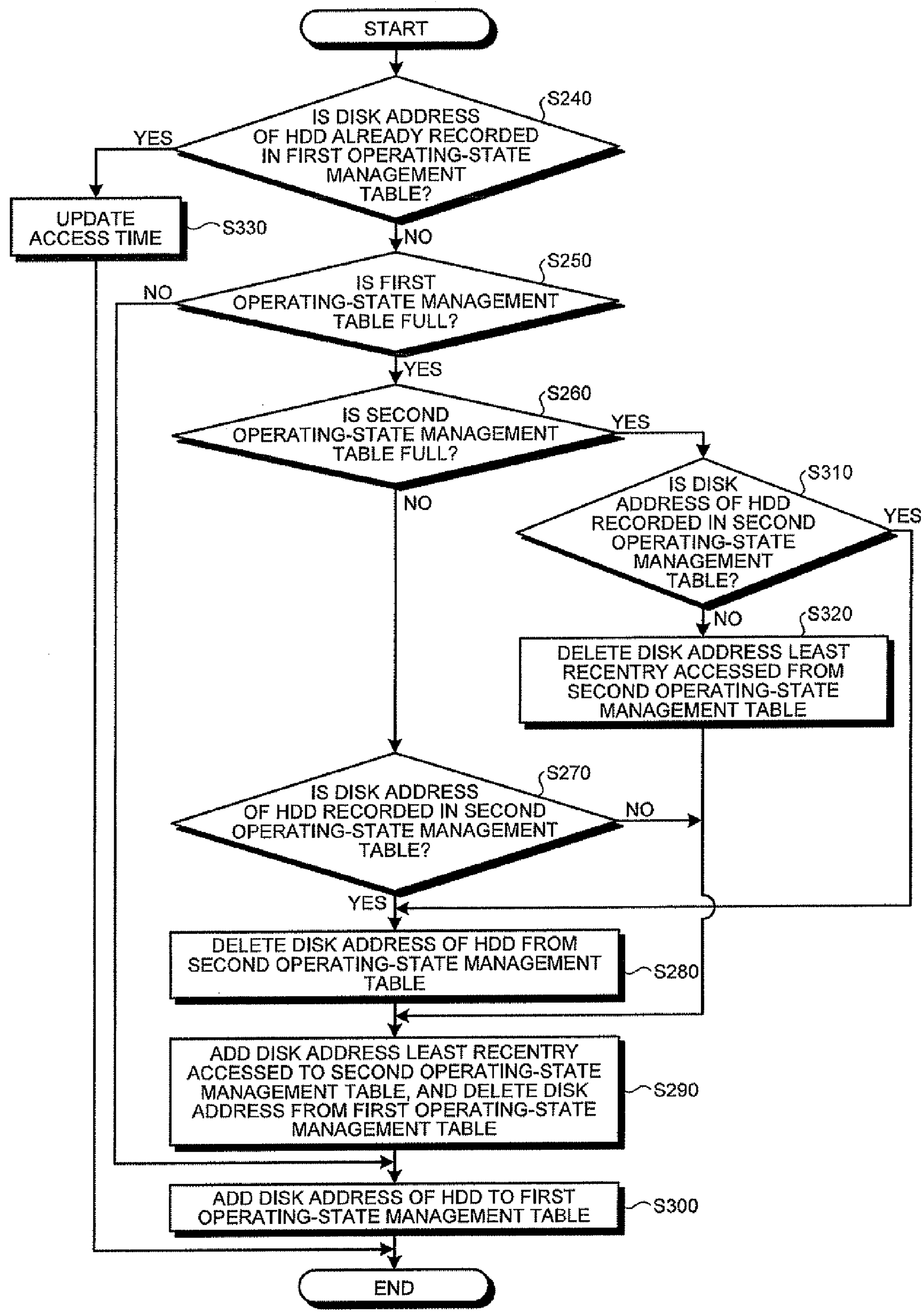
FIG. 7 is a flowchart of an updating process performed by a data transfer unit depicted in FIG. 1.

The operation of the expander 140 is described below with reference to FIGS. 6 and 7. FIGS. 6 and 7 are flowcharts of processes repeatedly performed while the expander 140 is in operation.

As depicted in FIG. 6, in the expander 140, if data output from the disk array controller 130 is received (YES at Step S180) and if an HDD from which data is read or to which data is written is among the HDDs 150A1 to 150An, which are subordinate to the controller enclosure 100 (YES at Step S190), data is read from or written to the HDD (Step S200).

If the data transfer unit 144 does not find the HDD from which data is read or to which data is written among the HDDs 150A1 to 150An, which are subordinate to the controller enclosure 100 (NO at Step S190), the data output from the disk array controller 130 is transferred to the device enclosure 200 (Step S230).

Returning to Step S200, the data transfer unit 144 performs an updating process, i.e., updates the first operating-state management table 142 and the second operating-state management table 143 after reading from or writing to the HDD (Step S210).

The operating state control unit 145 controls an operating state of each of the HDDs based on the updated first operating-state management table 142 and the updated second operating-state management table 143 (Step S220).

The updating process performed at Step S210 in FIG. 6 is described in detail below with reference to FIG. 7.

The data transfer unit 144 first determines if the disk address of an HDD from which data is read or to which data is written is already recorded in the first operating-state management table 142 (Step S240).

If the address is determined to be already recorded (YES at Step S240), the data transfer unit 144 updates the access time recorded therein (Step S330) and terminates the process.

If the address is determined not to be recorded and if there is space available for another record left therein (NO at Step S240 and NO at Step S250), the data transfer unit 144 adds the address and the access time of the HDD to the first operating-state management table 142 (Step S300).

If the address is determined not to be recorded and if there is no space available for another record (NO at Step S240 and YES at Step S250), the data transfer unit 144 refers to the second operating-state management table 143 to see if the second operating-state management table 143 is full (Step S260).

If there is space available for another record in the second operating-state management table 143 and if the disk address of the HDD is not recorded therein (NO at Step S260 and NO at Step 270), the data transfer unit 144 adds the disk address of an HDD least recently accessed in the first operating-state management table 142 to the second operating-state management table 143 and delete the disk address from the first operating-state management table 142 (Step S290).

This makes space available for another record in the first operating-state management table 142. Therefore, the data transfer unit 144 adds the disk address and the access time of the HDD to the first operating-state management table 142 (Step S300).

Returning to Step S270, if the disk address of the HDD is recorded in the second operating-state management table 143 (YES at Step S270), the disk address is deleted from the second operating-state management table 143 (Step S280) and Steps S290 and S300 are performed in this order.

Returning to Step S260, if there is no space available for another record in the second operating-state management table 143 and if the disk address of the HDD is not recorded in the second operating-state management table 143 (YES at Step S260 and NO at Step S310), the data transfer unit 144 deletes the disk address of an HDD least recently accessed from the second operating-state management table 143 (Step S320).

This makes space available for another record in the second operating-state management table 143. Therefore, the disk address of an HDD least recently accessed in the first operating-state management table 142 is added to the second operating-state management table 143, and the disk address is deleted from the first operating-state management table 142 (Step S290).

This makes space available for another record in the first operating-state management table 142. Therefore, the data transfer unit 144 adds the disk address and the access time of the HDD to the first operating-state management table 142 (Step S300).

Returning to Step S310, if the disk address of the HDD is recorded in the second operating-state management table 143 (YES at Step S310), Steps S280, S290, and S300 are performed in this order.

Now, assuming that the number of the HDDs mounted on the controller enclosure 100 is 10 and that the number of recording areas in each of the first operating-state management table 142 and the second operating-state management table 143 is three, the updating process is described in detail.

Examples of the updating process is described below with reference to FIGS. 8 to 10. In each table depicted in FIGS. 4 and 5, recording areas for a disk address and for an access time are arranged in a row. For convenience of description, however, in each table depicted in FIGS. 8 to 10, recording areas are arranged in column as well as a first operating-state management table and a second operating-state management table are summarized into one table. More specifically, the top three recording areas are the recording areas from the first operating-state management table 142, and the next three recording areas are from the second operating-state management table 143. For convenience of description, records of information in each table are sorted in ascending order with respect to access time of each of the HDDs.

With reference to FIG. 8, described below is the updating process performed when data is read from or written to an HDD having a disk address recorded in the first operating-state management table 142.

As depicted in FIG. 8, the corresponding relationship in which a disk address is “09” and an access time is “13:40” (see the left table) is updated to a new corresponding relationship in which the access time is the current time or “14:00” and the new corresponding relationship is moved to the top of the table (see the right table). Only the order of records in the first operating-state management table 142 is changed. Therefore, the operating state control unit 145 waits until the next update.

With reference to FIG. 9, described below is the updating process performed when data is read from or written to an HDD having a disk address recorded in the second operating-state management table 143.

As depicted in FIG. 9, the corresponding relationship in which a disk address is “03” and an access time is “13:33” (see the left table) is updated to a new corresponding relationship in which the access time is the current time or “14:00” and the new corresponding relationship is moved to the top of the table (see the right table). The updating process is performed so that the corresponding relationship having the oldest access time in the first operating-state management table 142, or more specifically the corresponding relationship in which a disk address is “09” and an access time is “13:40”, is removed therefrom and added to the second operating-state management table 143 as indicated by an arrow U1. As a result, the operating state control unit 145 changes the operating state of the HDD having the disk address “09” into standby.

With reference to FIG. 10, described below is the updating process performed when data is read from or written to an HDD having a disk address not recorded in any tables.

As depicted in FIG. 10, the corresponding relationship in which a disk address is “07” and an access time is “14:00” is recorded at the top of the first operating-state management table 142 (see the right table). Then, the updating process is performed so that the corresponding relationship having the oldest access time in the first operating-state management table 142, or more specifically the corresponding relationship in which disk address is “09” and an access time is “13:40”, is removed therefrom and added to the second operating-state management table 143 as indicated by an arrow U2 and so that the corresponding relationship having the oldest access time in the second operating-state management table 143, or more specifically the corresponding relationship in which a disk address is “10” and an access time is “11:49”, is removed therefrom as indicated by an arrow U3. As a result, the operating state control unit 145 changes the operating relationship of the HDD having the disk address “09” into standby, and instructs the power control unit 120 to turn off the HDD having the disk address “10”.

In the examples of the updating process described with reference to FIGS. 8 to 10, the current time is recorded as an access time in a corresponding relationship, and the corresponding relationship having the access time is moved to the top of the first operating-state management table 142. The corresponding relationship having the access time may not, however, be necessarily located at the top thereof, considering previous access frequency of the HDD in which the access time thereof is updated in the updating process. More specifically, a time previous to the current time by certain minutes may be recorded as an access time. The certain minutes may be decided depending on an access frequency of the HDD.

The storage system can include both SATA disks and SAS disks together.

In this case, a corresponding relationship between a disk address and an access time of an HDD is also similarly added to the first operating-state management table 142 and the second operating-state management table 143. Then, for example, disk addresses and access times only of SATA disks may be added thereto so that operating states only of SATA disk may be controlled. That way, it is expected that power consumption can be saved more efficiently, because an access frequency of a SAS disk is high although an access frequency of a SATA disk is not so high.

In FIG. 6, assuming that both of SATA disks and SAS disks are used in the storage system, the data transfer unit 144 may perform the processes at Steps S210 and S220 after reading from or writing to an HDD only if the HDD is a SATA disk.

In addition to disk addresses, disk type information may be managed, for example, by using the subordinate disk management table. Then, the disk type of each disk can be determined.

In the embodiment described above, by using two tables, an HDD having a disk address recorded in one of the tables is turned on while an HDD having a disk address recorded in the other table is brought into standby. However, this explanation is provided by way of example without limitation. For example, only one table may be provided in which corresponding relationships are recorded, and an HDD having a disk address recorded in the table may be turned on. Alternatively, for example, three tables may be provided so that an HDD may be brought into one of the different operating states in which power consumption of the HDD is saved gradually.

As described above, according to the present embodiment, only the HDDs are turned on of which the address of each is recorded in the first operating-state management table 142, and the other HDDs are brought into standby or are turned off. If an HDD is accessed more frequently, the address of the HDD is always recorded in the first operating-state management table 142. Assuming that an HDD is not accessed so frequently, even if the address of the HDD is recorded in the first operating-state management table 142, the address thereof is to be soon replaced by a disk address of an HDD more frequently accessed. Thus, operating state of an HDD can be controlled based on an access frequency thereof, and power consumed by an HDD can be more efficiently saved than the case where operating state of an HDD is controlled based on an access interval thereof. Such controlling operation is performed autonomously by an expander mounted on each of the enclosures. Therefore, a processing load of a storage system in which enclosures are connected to each other can be distributed among the expanders.

In the apparatus described above, an operating state of each of the storage devices is controlled based on the storage device management table. More specifically, the apparatus is configured, for example, so that a certain number of records are always selected from the top of a list of the corresponding relationships stored in the storage device management table and power is supplied to a storage device identified by identifying information contained in the selected corresponding relationships. A corresponding relationship containing identifying information of a storage device having a high access frequency is always ranked near the top because the time information thereof is new, and as a result, such a storage device is more frequently selected. Therefore, the storage device stays ON. In a storage device less frequently accessed than the storage device having a higher access frequency, a time period while the storage device less frequently accessed is OFF is longer than a time period while the same is ON, because a corresponding relationship of the same is less frequently selected. Therefore, power saving can be achieved more efficiently by controlling a state of each of the storage devices depending on an access frequency thereof than by controlling the same depending on an access interval thereof. A relay device in the storage apparatus performs such controlling operation autonomously, therefore, in a storage system in which a plurality of storage apparatuses are connected to each other, the processing load of the storage system can be distributed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A storage apparatus comprising:

a power supply unit that is connected to an external power source and supplies power;

a storage device that is supplied with power from the power supply unit to operate; and a relay device that controls access to the storage device, wherein the relay device is provided with a first region that stores a first storage device management information to register therein a predetermined number of corresponding relationships between identifying information and time information in an order of time indicated by the time information from newest to oldest, the identifying information identifying the storage device accessed by a server, the time information indicating a time at which the storage device is accessed by the server, the relay device is provided with a second region that stores a second storage device management information to register therein a predetermined number of the corresponding relationships in an order of time indicated by the time information from newest to oldest, the newest time indicated by the time information registered in the second storage device management information being older than the oldest time indicated by the time information registered in the first storage device management information, and the relay device includes an operation control unit that controls an operating state of the storage device based on the first storage device management information and the second storage device management information.

2. The storage apparatus according to claim 1, wherein the relay device further includes a registration unit that registers, when the storage device is accessed by the server, in the first storage device management information or in the first storage device management information and the second storage device management information, the corresponding relationship between the identifying information and the time information of the storage device accessed by the server.

3. The storage apparatus according to claim 2, wherein upon registering the corresponding relationship in the first storage device management information, when a corresponding relationship including the identifying information of the storage device has already been registered in the first storage device management information, the registration unit updates time information corresponding to the identifying information registered in the first storage device management table, and when a corresponding relationship including the identifying information of the storage device is yet to be registered in the first storage device management information and when entries in the first storage device management information exceed a predetermined number due to registration of the corresponding relationship, and the corresponding relationship has already been registered in the second storage device management information, the registration unit registers the corresponding relationship after deleting a corresponding relationship including oldest time information from the first storage device management information, and registers the corresponding relationship deleted from the first storage device management information to the second storage device management information after deleting the corresponding relationship registered to the first storage device management information from the second storage device management table, when a corresponding relationship including the identifying information of the storage device is yet to be registered in the first storage device management information and the second storage device management information, and when entries in the first storage device management information and the second storage device management information exceed a predetermined number due to registration of the corresponding relationship, the registration unit registers the corresponding relationship after deleting a corresponding relationship including oldest time information from the first storage device management information, and registers the corresponding relationship deleted from the first storage device management information to the second storage device management information after deleting a corresponding relationship including oldest time information from the second storage device management information.

4. The storage apparatus according to claim 1, further comprising an access request receiving unit that receives an access request directly from the server.

5. The storage apparatus according to claim 1, wherein the relay device receives an access request from the server that is transferred from another storage apparatus.

6. The storage apparatus according to claim 1, wherein the operation control unit controls an operating state of the storage device by changing the operating state of the storage device whose identifying information is registered in the first storage device management information to turn on, by changing the operating state of the storage device whose identifying information is registered in the second storage device management information to bring into standby, and by changing the operating state of the storage device whose identifying information is not registered in the first storage device management information and the second storage device management information to turn off.

7. A relay device that is provided in a storage apparatus including a storage device to control access to the storage device, the relay device comprising:

a first region that stores a first storage device management information to register therein a predetermined number of corresponding relationships between identifying information and time information in an order of time indicated by the time information from newest to oldest, the identifying information identifying the storage device accessed by a server, the time information indicating a time at which the storage device is accessed by the server;

a second region that stores a second storage device management information to register therein a predetermined number of the corresponding relationships in an order of time indicated by the time information from newest to oldest, the newest time indicated by the time information registered in the second storage device management information being older than the oldest time indicated by the time information registered in the first storage device management information, and an operation control unit that controls an operating state of the storage device based on the first storage device management information and the second storage device management information.

8. The relay device according to claim 7, further comprising a registration unit that registers, when the storage device is accessed by the server, in the first storage device management information or in the first storage device management information and the second storage device management information, the corresponding relationship between the identifying information and the time information of the storage device accessed by the server.

9. The relay device according to claim 8, wherein upon registering the corresponding relationship in the first storage device management information, when a corresponding relationship including the identifying information of the storage device has already been registered in the first storage device management information, the registration unit updates time information corresponding to the identifying information registered in the first storage device management table, and when a corresponding relationship including the identifying information of the storage device is yet to be registered in the first storage device management information and when entries in the first storage device management information exceed a predetermined number due to registration of the corresponding relationship, and the corresponding relationship has already been registered in the second storage device management information, the registration unit registers the corresponding relationship after deleting a corresponding relationship including oldest time information from the first storage device management information, and registers the corresponding relationship deleted from the first storage device management information to the second storage device management information after deleting the corresponding relationship registered to the first storage device management information from the second storage device management table, when a corresponding relationship including the identifying information of the storage device is yet to be registered in the first storage device management information and the second storage device management information, and when entries in the first storage device management information and the second storage device management information exceed a predetermined number due to registration of the corresponding relationship, the registration unit registers the corresponding relationship after deleting a corresponding relationship including oldest time information from the first storage device management information, and registers the corresponding relationship deleted from the first storage device management information to the second storage device management information after deleting a corresponding relationship including oldest time information from the second storage device management information.

10. A method of controlling an operating state of a storage device in a storage apparatus, the method being applied to a relay device that controls access to the storage device, the method comprising:

first registering in a first storage device management information a predetermined number of corresponding relationships between identifying information and time information in an order of time indicated by the time information from newest to oldest, the identifying information identifying the storage device accessed by a server, the time information indicating a time at which the storage device is accessed by the server;

second registering in a second storage device management information a predetermined number of the corresponding relationships in an order of time indicated by the time information from newest to oldest, the newest time indicated by the time information registered in the second storage device management information being older than the oldest time indicated by the time information registered in the first storage device management information, and controlling an operating state of the storage device based on the first storage device management information and the second storage device management information.

11. The method according to claim 10, wherein the registering includes updating, when a corresponding relationship including the identifying information of the storage device has already been registered in the first storage device management information, time information corresponding to the identifying information registered in the first storage device management table, and when a corresponding relationship including the identifying information of the storage device is yet to be registered in the first storage device management information and when entries in the first storage device management information exceed a predetermined number due to registration of the corresponding relationship, and the corresponding relationship has already been registered in the second storage device management information, deleting a corresponding relationship including oldest time information from the first storage device management information, and registering the corresponding relationship deleted from the first storage device management information to the second storage device management information after deleting the corresponding relationship registered to the first storage device management information from the second storage device management table, when a corresponding relationship including the identifying information of the storage device is yet to be registered in the first storage device management information and the second storage device management information, and when entries in the first storage device management information and the second storage device management information exceed a predetermined number due to registration of the corresponding relationship, deleting a corresponding relationship including oldest time information from the first storage device management information to register the corresponding relationship, and deleting a corresponding relationship including oldest time information from the second storage device management information to register the corresponding relationship deleted from the first storage device management information to the second storage device management information.

* * * * *